United States Patent [19]

Doi et al.

[11] Patent Number: 4,734,319

[45] Date of Patent: Mar. 29, 1988

[54] TRANSPARENT ELECTRICALLY CONDUCTIVE PLASTIC MOLDED ARTICLES

[75] Inventors: Toshiki Doi; Masanori Moriwaki; Yukio Yasunori, all of Osaka, Japan

[73] Assignee: Sumitomo Chemical Co., Ltd., Osaka, Japan

[21] Appl. No.: 5,275

[22] Filed: Jan. 20, 1987

[30] Foreign Application Priority Data

Jan. 24, 1986 [JP] Japan .................................. 61-14065
Jan. 24, 1986 [JP] Japan .................................. 61-14066

[51] Int. Cl.$^4$ .......................... B32B 5/16; B32B 9/00; B05D 7/00
[52] U.S. Cl. ..................................... 428/216; 428/323; 428/328; 428/409; 428/922; 427/214; 427/221
[58] Field of Search .............. 428/922, 409, 328, 323, 428/216; 427/44, 214, 221

[56] References Cited

U.S. PATENT DOCUMENTS 4,301,040 11/1981 Berbeco ........................ 428/317.9 X
4,308,568 12/1981 Whewell ........................ 428/409 X
4,455,350 6/1984 Berbeco ........................ 428/409 X
4,480,001 10/1984 Cannady, Jr. et al. ......... 428/922 X
4,632,527 12/1986 Masso et al. .................... 428/922 X

FOREIGN PATENT DOCUMENTS 57-85866 5/1982 Japan .
60-61258 4/1985 Japan .

*Primary Examiner*—George F. Lesmes
*Assistant Examiner*—D. R. Zirker
*Attorney, Agent, or Firm*—Cushman, Darby & Cushman

[57] ABSTRACT

A plastic molded article excellent in transparency, antistatic property and abrasion resistance is produced by providing on the surface of a base material comprising a transparent plastic molded article an electrically conductive coat layer comprising 60–80% by weight of an electrically conductive powder mainly composed of tin oxide and 20–40% by weight of a resin component and further providing thereon a topcoat layer comprising 0–50% by weight of an electrically conductive powder mainly composed of tin oxide and 50–100% by weight of a resin component.

8 Claims, No Drawings

TRANSPARENT ELECTRICALLY CONDUCTIVE PLASTIC MOLDED ARTICLES

BACKGROUND OF THE INVENTION

This invention relates to an antistatic plastic molded article.

In many cases materials for preservation, transportation or production of electronic materials are required to have antistatic properties. Hitherto, plastic molded articles for this purpose have been produced by molding a resin in which an electrically conductive material such as carbon powder, metallic fiber or the like is incorporated.

For making the material transparent in order that the content can be seen therethrough, there has been known a transparent electrically conductive coating composition having tin oxide electrically conductive powder in binder. (cf. Japanese Patent Unexamined Publication (Kokai) No. 85866/82)

Furthermore, there has been proposed a method of laminating a hard coat layer and an electrically conductive layer on a plastic sheet in this order to obtain an electrically conductive plastic sheet which is transparent and is excellent in abrasion resistance and solvent resistance. (cf. Japanese Patent Unexamined Publication (Kokai) No. 61258/85)

Also, there has been a method of coating an electrically conductive coating composition on a transparent resin surface and then coating thereon a topcoat layer having no electrical conductivity.

Recently, antistatic plastic molded articles used for preservation, transportation or manufacture of electronic materials have been required to have transparency in addition to antistatic properties. Besides, increase or improvement of hardness and abrasion resistance have also been demanded for keeping transparency and aesthetic appearance.

However, according to the conventional method, namely, incorporation of carbon powder or metallic fiber in a resin, the transparency cannot be obtained and furthermore, according to the method of using an electrically conductive fine powder mainly composed of tin oxide, the electrically conductive fine powder must be added in a large amount in order to obtain the desired conductivity and this causes loss of transparency, reduction of strength or deterioration of abrasion resistance.

SUMMARY OF THE INVENTION

The object of this invention is to provide a plastic molded article excellent in transparency, antistatic property and abrasion resistance and free from the defects seen in the conventional methods.

The above object has been attained by providing on the surface of a transparent plastic molded article an electrically conductive coat layer comprising 60–80% by weight of an electrically conductive powder mainly composed of tin oxide and 20–40% by weight of a resin component and laminating on said electrically conductive layer a topcoat layer comprising 0–50% by weight of an electrically conductive powder mainly composed of tin oxide and 50–100% by weight of a resin component.

DESCRIPTION OF THE INVENTION

Raw material resins for the transparent plastic molded article to which this invention is suitably applicable have no limitations, but as examples thereof, mention may be made of vinyl chloride resins, polycarbonates, homo- and co-polymers mainly composed of methyl methacrylate, polystyrenes, modified polystyrenes, acrylonitrile-styrene copolymers and methyl methacrylate-styrene copolymers.

Of these resins, preferred are methyl methacrylate type resins considering strengths (surface hardness, etc.) and aesthetic appearances (transparency and tinting).

The plastic molded articles according to this invention include those in the form of a sheet or a film and besides various molded articles produced by injection molding and press molding.

The electrically conductive coat layer on the base for the plastic molded articles according to this invention is required to have transparency and excellent electrical conductivity.

For the above purpose, the electrically conductive powder must be contained in an amount of 60–80% by weight in the electrically conductive coat layer. When the content is less than 60 % by weight, the electrical conductivity of plastic molded articles can be little maintained and when it is more than 80 % by weight the transparency is markedly reduced and formation of the coat layer becomes very difficult. As the electrically conductive powder in the electrically conductive coat layer, there may be used a powder mainly composed of tin oxide of 0.2 $\mu$m or less in particle size. When the particle size is more than 0.2 $\mu$m, visible light is scattered to cause reduction of transparency of the coating film.

As the resin component which forms the electrically conductive coat layer, mention may be made of solvent type or emulsion type transparent film forming coating compositions, resins capable of forming a crosslinking-hardened resin film, etc., but the cross-linking-hardenable resins which are hardenable with light, activated energy rays or heat are preferred in order to increase surface hardness of plastic molded articles.

The topcoat layer provided on the electrically conductive coat layer contains 0–50% by weight, preferably 2–50% by weight, more preferably 5–30% by weight of an electrically conductive powder mainly composed of tin oxide. When the electrically conductive powder is contained in an amount of less than 2 % by weight, all necessary is to make the topcoat 1 $\mu$m thick or less, from a practical point of view. When the content of the powder is too high, namely more than 50 % by weight, reductions in transparency and surface hardness are brought about.

As the resin components which form the topcoat layer, mention may be made of solvent type or emulsion type transparent film forming coating compositions, resins capable of forming a crosslinking-hardened resin film, etc. Preferably, there may be used the same resin components or the same type resin components as used for the electrically conductive coat layer. Thus, as mentioned above, there may be suitably used crosslinking-hardenable resins hardenable with light, activated energy rays or heat to increase surface hardness of the plastic molded articles produced.

It is necessary that the topcoat layer as a surface layer secures the surface hardness and transparency of the obtained plastic molded article without damaging the electrical conductivity of the inner electrically conductive coat layer.

That is, the electrically conductive coat layer alone cannot provide sufficient transparency and surface hardness although electrical conductivity is satisfactory. However, these problems can be solved by providing a topcoat layer with or without a relatively small amount of the electrically conductive powder without causing reduction of conductivity.

Furthermore, the respective thickness of the electrically conductive coat layer and the topcoat layer and the total thickness of these layers are important in this invention. Thickness of the electrically conductive coat layer is preferably 5 μm or less. When it is more than 5 μm, transparency is reduced and furthermore, abrasion resistance is also deteriorated. Practically, even when it is less than 1 μm, satisfactory characteristics can be maintained.

Thickness of the topcoat layer is preferably 10 μm or less, when the electrically conductive powder is contained in such an amount as 2–50%. The thickness of the topcoat layer is made greater relatively in comparison with that of the electrically conductive coat layer, in order to improve abrasion resistance. For example, the thickness may be within the range of 0.5–5 μm. It is beyond expectation that electrical conductivity does not decrease so much that it is able to maintain within the range which is enough for practical purpose, even if the thickness of the topcoat layer containing a small amount of the electrically conductive powder is increased. This is also one of features of the present invention. The object of the present invention is achieved by making the topcoat layer 1 μm thick or thinner when the electrically conductive powder is contained in an amount of less than 2 % by weight.

Moreover, total thickness of the electrically conductive coat layer and the topcoat layer is preferably 10 μm or less. When it is more than 10 μm, cracks tend to occur in the coat layers and adhesion to the plastic base is deteriorated.

As raw materials for the resin component in this invention, there may be used crosslinking-hardenable resin materials which are hardenable with light, activated energy rays or heat. As these crosslinking-hardenable resin materials, there may be used various resin materials having a group which can cause hardening with crosslinking in molecule, but crosslinking-hardenable resin materials containing at least two acryloyl groups or methacryloyl groups as crosslinking-hardenable unsaturated group in one molecule are preferred in view of transparency, adhesion to a plastic base and abrasion resistance.

As examples of the crosslinking-hardenable resin materials, mention may be made of polyacrylates or polymethacrylates of polyhydric alcohols such as trimethylolpropane triacrylate or trimethacrylate, trimethylolethane triacrylate or trimethacrylate, pentaglycerol triacrylate or trimethacrylate, pentaerythritol triacrylate or trimethacrylate, pentaerythritol tetracrylate or tetramethacrylate, glycerin triacrylate or trimethacrylate, dipentaerythritol triacrylate or trimethacrylate, dipentaerythritol tetracrylate or tetramethacrylate, dipentaerythritol pentaacrylate or pentamethacrylate, dipentaerythritol hexaacrylate or hexamethacrylate, tripentaerythritol tetracrylate or tetramethacrylate, tripentaerythritol pentacrylate or pentamethacrylate, 2,2-bis(4-acryloxydiethoxyphenyl)propane, 2,2-bis(4-methacryloxyethoxyphenyl)propane,diethylene glycol di(metha)acrylate, triethylene glycol di(metha)acrylate, tetraethylene glycol dimethacrylate, tripentaerythritol hexaacrylate or hexamethacrylate, tripentaerythritol heptaacrylate or heptamethacrylate, etc.; saturated or unsaturated polyester polyacrylates or polymethacrylates derived from the combinations of compounds such as malonic acid/trimethylolethane/acrylic acid or methacrylic acid, malonic acid/trimethylolpropane/acrylic acid or methacrylic acid, malonic acid/glycerin/acrylic acid or methacrylic acid, malonic acid/pentaerythritol/acrylic acid or methacrylic acid, succinic acid/trimethylolethane/acrylic acid or methacrylic acid, succinic acid/trimethylolpropane/acrylic acid or methacrylic acid, succinic acid/glycerin/acrylic acid or methacrylic acid, succinic acid/pentaerythritol/acrylic acid or methacrylic acid, adipic acid/trimethylolethane/acrylic acid or methacrylic acid, adipic acid/trimethylolpropane/acrylic acid or methacrylic acid, adipic acid/pentaerythritol/acrylic acid or methacrylic acid, adipic acid/glycerin/acrylic acid or methacrylic acid, glutaric acid/trimethylolethane/acrylic acid or methacrylic acid, glutaric acid/trimethylolpropane/acrylic acid or methacrylic acid, glutaric acid/glycerin/acrylic acid or methacrylic acid, glutaric acid/pentaerythritol/acrylic acid or methacrylic acid, sebacic acid/trimethylolethane/acrylic acid or methacrylic acid, sebacic acid/trimethylolpropane/acrylic acid or methacrylic acid, sebacic acid/glycerin/acrylic acid or methacrylic acid, sebacic acid/pentaerythritol/acrylic acid or methacrylic acid, fumaric acid/trimethylolethane/acrylic acid or methacrylic acid, fumaric acid/trimethylolpropane/acrylic acid or methacrylic acid, fumaric acid/glycerin/acrylic acid or methacrylic acid, fumaric acid/pentaerythritol/acrylic acid or methacrylic acid, itaconic acid/trimethylolethane/acrylic acid or methacrylic acid, itaconic acid/trimethylolpropane/acrylic acid or methacrylic acid, itaconic acid/pentaerythritol/acrylic acid or methacrylic acid, maleic anhydride/trimethylolethane/acrylic acid or methacrylic acid, maleic anhydride/glycerin/acrylic acid or methacrylic acid, etc.

Furthermore, the resin may be urethane compounds such as urethane acrylate, etc. obtained by reacting, by conventional methods, isocyanate-containing compounds with at least 2 moles (per one molecule of isocyanate) of acrylic monomers having at least one active hydroxyl group. The isocyanate-containing compounds include divalent or trivalent polyisocyanate compounds such as tolylene diisocyanate, xylene diisocyanate, diphenylmethane diisocyanate, isophorone diisocyanate, hexamethylene diisocyanate, dicyclohexylmethane diisocyanate, diisocyanate compounds obtained by hydrogenation of aromatic isocyanates among the above enumerated disiocyanate compounds (e.g., hydrogenated xylylene diisocyanate and hydrogenated diphenylmethane diisocyanate), triphenylmethane triisocyanate, dimethylenetriphenyl triisocyanate, etc. or polyisocyanate compounds obtained by polymerizing diisocyanate compounds. The acrylic monomers include 2-hydroxyethyl acrylate or methacrylate, 2-hydroxypropyl acrylate or methacrylate, 2-hydroxy-3-methoxypropyl acrylate or methacrylate N-methylolacrylamide or methacrylamide, N-hydroxyacrylamide or methacrylamide, etc.;

Triacrylate or trimethacrylate of tris(2-hydroxyethyl-)isocyanuric acid, etc.

Urethane compounds may further be those obtained by reacting polyols with compounds having two or more isocyanate groups in a molecule, thereby to allow terminal isocyanate group to react with acrylate or methacrylate having functional hydrogen atoms. The polyols are, for example, ethyleneglycol, 1,2-propanediol, 1,3-propanediol, neopentylglycol, 1,2-butanediol, 1,3-butanediol, 1,4-butanediol, 2,3-butanediol, 1,5-hepanediol, 1,6-hexanediol, diethyleneglycol, dipropyleneglycol, trimethylolpropane, polyethyleneglycol, polypropyleneglycol, polyoxytetramethyleneglycol, pentaerythritol, condensed polyesterglycol, e.g. adipic acid/ethyleneglycol, adipic acid/propanediol, adipic acid/neopentylglycol, adipic acid/butanediol, adipic acid/hexanediol; ring-opened polymer having terminal hydroxyl groups of ε-caprolactam. The isocyanates are, for example, hexamethylene diisocyanate, methylene diphenyl diisocyanate, toluene diisocyanate, xylene diisocyanate, methylene dicyclohexyl diisocyanate and isophorone diisocyanate. Thus, terminal isocyanate group reacts with acrylate or methacrylate having hydroxy group such as 2-hydroxyethyl acrylate or methacrylate, 2-hydroxypropyl acrylate or methacrylate, 1,6-hexanediol monoacrylate or methacrylate, 1,4-butanediol monoacrylate or monomethacrylate, neopentylglycol monoacrylate or monomethacrylate, glycerin diacrylate or dimethacrylate, trimethylolethane diacrylate or dimethacrylate, trimethylolpropane diacrylate or dimethacrylate, pentaerythritol diacrylate or dimethacrylate, pentaerythritol triacrylate or trimethacrylate, diglycerin diacrylate or dimethacrylate, diglycerin triacrylate or trimethacrylate, ditrimethylolethane diacrylate or dimethacrylate, ditrimethylolethan triacrylate or trimethacrylate, ditrimethylolpropane diacrylate or dimethacrylate, ditrimethylolpropane triacrylate or trimethacrylate, dipentaerythritol diacrylate or dimethacrylate, dipentaerythritol triacrylate or trimethacrylate, dipentaerythritol tetraacrylate or tetramethacrylate, dipentaerythritol pentaacrylate or pentamethacrylate, tripentaerythritol diacrylate or dimethacrylate, tripentaerythritol triacrylate or trimethacrylate, tripentaerythritol tetraacrylate or tetramethacrylate, tripentaerythritol pentaacrylate or pentamethacrylate, tripentaerythritol hexaacrylate or hexamethacrylate, and tripentaerythritol heptaacrylate or heptamethacrylate. Alternatively, urethane compounds may be those obtained by reacting acrylate or methacrylate having the same hydroxyl group as above with compounds having the same isocyanate groups as mentioned above.

These compounds may be used alone or in combination of two or more. When they are used in admixture, there may be suitably used mixtures of said saturated or unsaturated polyester polyacrylates or polymethacrylates or urethane compounds such as urethane acrylate, etc. with polyfunctional acrylates or methacrylates such as dipentaerythritol triacrylate or trimethacrylate, dipentaerythritol tetraacrylate or tetramethacrylate, dipentaerythritol pentaacrylate or pentamethacrylate, dipentaerythritol hexaacrylate or hexamethacrylate, tripentaerythritol triacrylate or trimethacrylate, tripentaerythritol tetraacrylate or tetramethacrylate, tripentaerythritol pentaacrylate or pentamethacrylate, tripentaerythritol hexaacrylate or hexamethacrylate etc.

As abrasion resistant film forming resin materials which are hardenable with heat, there may be used silicone compounds.

The silicone resin materials include condensates obtained by hydrolysis or co-hydrolysis of at least one compound selected from the group consisting of the compounds represented by the general formulas: $R^1Si(OR^2)_3$, $Si(OR^2)_4$ and $R^1nSiX_{4-n}$ (wherein $R^1$ is an $R1Si(OR2)3$, $Si(OR )4$ alkyl group such as methyl, ethyl, butyl, etc., a phenyl group, an unsaturated hydrocarbon group such as vinyl, allyl or the like, an epoxy group or an amino group, $R^2$ is an alkyl group such as methyl, ethyl or the like or an acyl group such as acetyl or the like, X is a halogen and n is an integer of 1–3). As examples of the compounds represented by the general formulas, there may be used one or more of methyltrimethoxysilane, methyltriethoxysilane, phenyltriethoxysilane, vinyltriethoxysilane, tetraethoxysilane, tetramethoxysilane, etc.

Furthermore, dispersants, leveling agents, photosensitizers, antioxidants, ultraviolet light absorbers, various stabilizers, etc. may be contained in the raw materials for the resin components for improving dispersibility of the electrically conductive powder, spreadability, hardenability of film, weather resistance of film, etc. An electrically conductive powder mainly composed of tin oxide and the above raw material composition for forming the resin component are mixed to obtain a coating composition. This composition may be coated by spray method, doctor blade method, dipping method, bar coat method, roll coat method, etc. The coating composition may be diluted with a diluent before coating for adjustment of film thickness and improvement of operability. As the diluents, there may be used those which are generally used for coating compositions such as toluene, xylene, ethyl acetate, butyl acetate, a thinner, etc.

For dispersion of the electrically conductive powder in the coating composition, there may be employed the methods carried out in production of common coating compositions, such as, for example, sand mill, ball mill, high speed rotary agitator, etc. In order to attain more homogeneous dispersion, there may be used silane coupling agent, titanium coupling agent, surface active agent, organic acids such as oleic acid as a dispersion assistant.

Hardening of the film can be accomplished with light, activated energy rays or heat considering film forming materials, bases or productivity, among which irradiation with ultraviolet ray and application of heat are generally employed and suitable for this invention.

The following non-limiting examples illustrate this invention, wherein evaluations of the resulting plastic molded articles were carried out in the following manner.

(1) Abrasion resistance: Abrasion test was conducted using a steel wool of #1000 and the results were graded as follows:
(A): No abrasion occurred even by strong rubbing.
(B): A slight abrasion occurred by strong rubbing.
(C): A slight abrasion occurred by light rubbing.
(D): A heavy abrasion occurred even by light rubbing.

(2) Transparency (haze)
This was measured in accordance with ASTM D1003.

(3) Adhesion: This was determined by crosscut cellophane peeling test. That is, coated layer was cut by 11 lines at an interval of 1 mm in lengthwise and breadthwise directions, respectively so that the cut reached the base, thereby to form 100 squares of 1 mm² each. A cellophane tape was applied thereto and was rapidly peeled off. This operation was repeated thrice on the same portion and the number of the squares which were not peeled off was counted. The adhesion was expressed by this number.

(4) Surface resistivity: This was measured by a super insulation resistance tester (manufactured by Toa Denpa Co., Ltd.)

(5) Half-life period: This was measured by a static honest meter (manufactured by Shishido Shokai Co., Ltd.)

EXAMPLE 1-3 AND COMPARATIVE EXAMPLES 1 and 2

(1) Synthesis of polyfunctional urethane acrylate

In a 1 l glass reactor equipped with a stirrer, a thermometer and a dropping funnel were charged 242 g of trimethylolpropane diacrylate and 0.25 g of hydroquinone monomethyl ether and temperature was kept at 60° C. Thereto was added dropwise 85 g of 2,4-tolylene diisocyanate over a period of 1 hour. The content was stirred for 1 hour at the same temperature, followed by adding 0.05 g of dibutyltin diacetate and then reaction was continued for further 2 hours. After completion of the reaction, there was obtained 325 g of polyfunctional urethane acrylate. Isocyanate content of the product was 0.03 %.

(2) Preparation of ultraviolet hardening coating composition.

300 g of dipentaerythritol hexaacrylate, 300 g of said polyfunctional urethane acrylate, 150 g of butyl acetate and 30 g of 1-hydroxycyclohexylphenyl ketone were well mixed to obtain an ultraviolet hardening coating composition.

(3) Preparation of electrically conductive coating composition (A).

To 150 g of said ultraviolet hardening coating composition were added 350 g of a commercially available tin oxide powder (manufactured by Mitsubishi Metal Corp., particle diameter 0.1 μm or less) and 10 g of oleic acid as a dispersant and there were mixed for 20 hours by a ball mill to obtain the electrically conductive coating composition (A).

(4) Preparation of coating composition (A) for top coat.

To said electrically conductive coating composition (A) were added said ultraviolet hardening coating composition and a mixture of ethyl acetate/xylene (1/1) in the amounts as shown in Table 1 to obtain a coating composition (A) for top coat.

(5) Production of a transparent electrically conductive plastic sheet.

On a methyl methacrylate resin sheet of 2 mm thick (Sumipex E® #000 manufactured by Sumitomo Chemical Co., Ltd.) was coated the electrically conductive coat composition (A) diluted to twice volume with a mixed solution of ethyl acetate/xylene (1/1) by a bar coater. This was left to stand for 20 minutes and then irradiated with ultraviolet ray for 5 seconds at 120 W by a high pressure mercury arc lamp (Ai Cure-UE021-403C, 500 V, HO2-L41(2) manufactured Ai Graphics Co., Ltd.) at a distance of 250 mm in the air. Thereafter, on this coat was further coated the coating composition (A) for top coat and this was irradiated with ultraviolet ray for 10 seconds by the same device and method as above.

Thickness of each layer and content of the electrically conductive powder in each layer thus provided on the transparent electrically conductive plastic sheet are shown in Table 1 and properties are shown in Table 2.

TABLE 1

| | Electrically conductive coat layer | | Topcoat layer | | | |
|---|---|---|---|---|---|---|
| | Film thickness (μm) | Content of conductive filler (wt %) | X Part by weight | Y Part by weight | Film thickness (μm) | Content of conductive filler (wt %) |
| Example | | | | | | |
| 1 | 0.8 | 68.6 | 233 | 556 | 3.2 | 20.6 |
| 2 | 0.8 | 68.6 | 500 | 1000 | 4.0 | 11.4 |
| 3 | 0.8 | 68.6 | 900 | 1667 | 3.8 | 6.9 |
| Comparative Example | | | | | | |
| 1 | 0.8 | 68.6 | 5900 | 10000 | 4.0 | 1.2 |

TABLE 1-continued

| | Electrically conductive coat layer | | Topcoat layer | | | |
|---|---|---|---|---|---|---|
| | Film thickness ($\mu$m) | Content of conductive filler (wt %) | X Part by weight | Y Part by weight | Film thickness ($\mu$m) | Content of conductive filler (wt %) |
| 2 | 0.8 | 68.6 | 20 | 200 | 3.9 | 57.2 |

X: Amount of the ultraviolet hardening coating composition for 100 parts by weight of the electrically conductive coating composition (A).
Y: Amount of the mixture of ethyl acetate/xylene (1/1) for 100 parts by weight of the electrically conductive coating composition (A).

TABLE 2

| | Properties of film | | | Antistatic properties | |
|---|---|---|---|---|---|
| | Adhesion | Steel wool test | Haze | Surface resistivity | Half-life period |
| Example | | | | | |
| 1 | 100/100 | A | 2.3 | $5 \times 10^7 \Omega$ | No electrification |
| 2 | 100/100 | A | 1.6 | $5 \times 10^8$ | Less than 1 second |
| 3 | 100/100 | A | 1.0 | $8 \times 10^8$ | Less than 1 second |
| Comparative Example | | | | | |
| 1 | 100/100 | A | 0.9 | $2 \times 10^{10}$ | 90 seconds |
| 2 | 0/100 | C | 4.0 | $2 \times 10^7$ | No electrification |

(3) Production of a transparent electrically conductive plastic sheet.

On a methyl methacrylate resin sheet of 2 mm thick (Sumipex E® #000 manufactured by Sumitomo Chemical Co., Ltd.) was coated said electrically conductive coating composition (B) by a bar coater and this was left to stand for 20 minutes and then was irradiated with ultraviolet ray in the air in the same manner as in Examples 1–3. On this layer were further coated the coating composition (B) for top coat and a mixture of ethyl acetate/xylene (1/1) in the amounts as shown in Table 3, followed by irradiation with ultraviolet ray for 10 seconds in the same manner as above. The results are shown in Table 3 and Table 4.

TABLE 3

| | Electrically conductive coat layer | | | Top coat layer | | |
|---|---|---|---|---|---|---|
| | Z (Part by weight) | Film thickness ($\mu$m) | Amount of conductive filler (wt %) | W (Part by weight) | Film thickness ($\mu$m) | Amount of Conductive filler (wt %) |
| Example | | | | | | |
| 4 | 0 | 4 | 68.6 | 167 | 3.8 | 11.4 |
| 5 | 300 | 0.4 | 68.6 | 167 | 3.9 | 11.4 |
| 6 | 100 | 0.8 | 68.6 | 3000 | 0.2 | 11.4 |
| 7 | 100 | 0.8 | 68.6 | 50 | 8 | 11.4 |
| Comparative Example | | | | | | |
| 3 | 0 | 7 | 68.6 | 167 | 3.8 | 11.4 |
| 4 | 100 | 0.8 | 68.6 | 5000 | 0.1 | 11.4 |
| 5 | 100 | 0.8 | 68.6 | 0 | 11 | 11.4 |
| 6 | 100 | 0.8 | 68.6 | — | — | — |

Z: Amount (part by weight) of mixture of ethyl acetate/xylene (1/1) for 100 parts by weight of electrically conductive coating composition (A).
W: Amount (part by weight) of mixture of ethyl acetate/xylene (1/1) for 100 parts by weight of coating composition (B) for top coat.

EXAMPLES 4–7 AND COMPARATIVE EXAMPLES 3–6

(1) Preparation of electrically conductive coating composition(B).

To the electrically conductive coating composition (A) of Examples 1–3 was added a mixture of ethyl acetate/xylene (1/1) in the amounts as shown in Table 3 to obtain electrically conductive coating composition (B).

(2) Preparation of coating composition (B) for top coat.

To 50 g of the electrically conductive coating composition (A) was added 250 g of the ultraviolet hardening coating composition of Examples 1–3 to obtain coating composition (B) for top coat.

TABLE 4

| | Properties of film | | | Antistatic properties | |
|---|---|---|---|---|---|
| | Adhesion | Steel wool test | Haze (%) | Surface resistivity | Half-life period |
| Example | | | | | |
| 4 | 100/100 | A | 4.0 | $2 \times 10^8 \Omega$ | Less than 1 second |
| 5 | 100/100 | A | 0.9 | $8 \times 10^8$ | Less than 1 second |
| 6 | 100/100 | B | 0.9 | $6 \times 10^8$ | Less than 1 second |
| 7 | 100/100 | A | 1.0 | $9 \times 10^8$ | Less than 1 second |
| Comparative Example | | | | | |
| 3 | 40/100 | C | 10 | $1 \times 10^8$ | Less than 1 second |
| 4 | 100/100 | C | 0.9 | $1 \times 10^8$ | Less than 1 second |

TABLE 4-continued

| | Properties of film | | Antistatic properties | |
|---|---|---|---|---|
| | Adhesion | Steel wool test | Haze (%) | Surface resistivity | Half-life period |
| 5 | 34/100 | C | 2.3 | $5 \times 10^{10}$ | 100 seconds |
| 6 | 100/100 | C | 6.3 | $5 \times 10^{8}$ | Less than 1 second | irradiated with ultraviolet ray for 5 seconds at 120 W by a high pressure mercury arc lamp (Ai Cure-UE021-403C, 500 V, H02-L41 (2) manufactured by Ai Graphics Co.) at a distance of 250 mm in the air. On this coat was further coated the ultraviolet hardening coating composition prepared in the above (2) at a predetermined thickness and this was hardened in the same manner as above. Properties of thus obtained sheet are shown in Table 5.

TABLE 5

| Film thickness | | | | Electric properties | | | |
|---|---|---|---|---|---|---|---|
| Electrically conductive coat layer (μm) | Top coat layer (μm) | Adhesion | Steel wool test | Surface resistivity | Electrification voltage KV | Half-life period (seconds) | Haze (%) |
| Example | | | | | | | |
| 8  0.9 | 1.0 | Good | A | $7 \times 10^{9}\Omega$ | 0.27 | 90 | 1.0 |
| 9  0.2 | 0.3 | " | A | $4 \times 10^{8}$ | 0.06 | 30 | 0.6 |
| 10  0.8 | 0.2 | " | B | $1 \times 10^{8}$ | 0 | Less than 1 | 1.0 |
| 11  2.0 | 1.0 | " | A | $7 \times 10^{9}$ | 0.25 | 80 | 2.0 |
| Comparative Example | | | | | | | |
| 7  6.0 | 1.0 | " | A | $7 \times 10^{9}$ | 0.30 | 100 | 1.0 |
| 8  0.9 | 1.5 | " | A | $9 \times 10^{14}$ | 1.5 | More than 200 | 1.0 |
| 9  0 | 1.0 | " | A | More than $10^{15}$ | 1.8 | More than 200 | 0.3 |
| 10  0.9 | 0 | " | C | $5 \times 10^{8}$ | 0 | Less than 1 | 6.3 |

EXAMPLES 8-11 AND COMPARATIVE EXAMPLES 7-10

(1) Preparation of polyfunctional urethane acrylate.

In a 1 l glass reactor equipped with a stirrer, a thermometer and a dropping funnel were charged 242 g of trimethylolpropane diacrylate and 0.25 g of hydroquinone monomethyl ether, followed by adding dropwise 85 g of 2,4-tolylene diisocyanate over a period of 1 hour with keeping the temperature at 60° C. The content was stirred for 1 hour at this temperature, followed by adding 0.05 g of dibutyltin diacetate and then reaction was continued for further 2 hours. After completion of the reaction, there was obtained 325 g of polyfunctional urethane acrylate, which contained 0.03 % of isocyanate.

(2) Preparation of ultraviolet hardening coating composition.

The resulting urethane acrylate, 300 g of dipentaerythritol hexaacrylate, 150 g of n-butyl acetate and 15 g of 1-hydroxycyclohexylphenyl ketone were mixed to obtain an ultraviolet hardening coating composition.

(3) Preparation of electrically conductive coating composition.

To 120 g of the coating composition obtained above were added 280 g of tin oxide powder (manufactured by Mitsubishi Metal Corp., particle diameter 0.1 μm or less), 300 g of xylene and 300 g of ethyl acetate and 5 g of sodium naphthalenesulfonate-formalin condensate and the mixture was charged in a ball mill to bring about dispersion to obtain an electrically conductive coating composition.

(4) Production of a transparent electrically conductive plastic sheet.

On a methyl methacrylate resin sheet of 2 mm thick (Sumipex E® #000 manufactured by Sumitomo Chemical Co., Ltd.) was coated said electrically conductive coating composition at a predetermined thickness. This was left to stand for 20 minutes and then was

COMPARATIVE EXAMPLE 11

The position of the electrically conductive coat layer and that of the top coat layer in Example 8 were reversed, namely, first the top coat layer was coated on the resin sheet and hardened and then thereon was coated the electrically conductive layer and hardened. The films of thus obtained methyl methacrylate resin sheet was superior in adhesion and also superior in electric properties, namely, surface resistivity: $5 \times 10^{8}$ Ω, electrification voltage: 0 KV and half-life period: less than 1 second, but inferior in transparency (haze 6.3) and abrasion resistance (steel wool test C). This product was not suitable for practical use.

COMPARATIVE EXAMPLE 12

On a methyl methacrylate resin sheet (2 mm thick) was coated an electrically conductive coating composition (Shintoron® C-4421 manufactured by Shinto Paint Co., Ltd.) at a thickness of 0.9 μm and was dried. Then, thereon was coated the ultraviolet hardening coating composition of Example 8 at a thickness of 1 μm. Thus obtained resin sheet was at grade D of the steel wool test and was very poor in abrasion resistance.

We claim:

1. A transparent plastic molded article having excellent electrical conductivity which has, on the surface thereof, an electrically conductive coat layer (a) comprising 60-80% by weight of an electrically conductive powder consisting essentially of tin oxide having a particle diameter of not more than 0.2 μm and 20-40% by weight of a crosslinking-hardenable resin and a layer (b) comprising 0-50% by weight of an electrically conductive powder consisting essentially of said tin oxide having a particle diameter of not more than 0.2 μm and 50-100% by weight of a crosslinking-hardenable resin, said layer (b) being provided on layer (a) and the total thickness of said layers (a) and (b) being not more than 10 μm.

2. A transparent plastic molded article according to claim 1 wherein the layer (b) comprises 0-2% by weight of the electrically conductive powder and 98-100% by weight of the resin and is not more than 1 μm thick and the layer (a) is not more than 5 μm thick.

3. A plastic molded article according to claim 1 wherein the layer (b) comprises 2-50% by weight of the electrically conductive powder and 50-98% by weight of the resin.

4. A plastic molded article according to claim 3 wherein the layer (b) is less than 10 μm thick and the layer (a) is not more than 5 μm thick.

5. A plastic molded article according to claim 1, wherein the resin of the layers (a) and (b) is abrasion resistant.

6. A plastic molded article according to claim 1 wherein the resin contains at least two acrylol or methacryloyl groups in one molecule.

7. A plastic molded article according to claim 1 wherein the crosslinking-hardenable resin is made from at least one member selected from the group consisting of polyacrylates or polymethacrylates of polyhydric alcohols, saturated or unstaturated polyester polyacrylates or polymethacrylates, urethane compounds and silicone compounds.

8. A method for making a transparent plastic molded article which comprises:
(i) coating the surface of a transparent molded article with a coating composition (a) comprising 60-80% by weight of an electrically conductive powder consisting essentially of tin oxide having particle diameter of not more than 0.2 μm and 20-40% by weight of a crosslinking-hardenable resin,
(ii) applying thereto light, activated energy rays or heat until the hardened, electrically conductive coat layer is formed,
(iii) coating thereon a coating composition (b) comprising 0-50% by weight of said electrically conductive powder and 50-100% by weight of a crosslinking-hardenable resin, and
(iv) applying thereto light, activated energy rays or heat until a topcoat layer is formed, wherein during said method, the total thickness of layers of the compositions (a) and (b) is controlled to be not more than 10 μm.

* * * * *